Feb. 22, 1955  J. L. PETTUS  2,702,705
FILM DRIVE MECHANISM FOR MOTION-PICTURE APPARATUS
Filed Jan. 18, 1950

INVENTOR.
James L. Pettus
BY
ATTORNEY.

United States Patent Office 2,702,705
Patented Feb. 22, 1955

2,702,705

FILM DRIVE MECHANISM FOR MOTION-PICTURE APPARATUS

James L. Pettus, Encino, Calif., assignor to Radio Corporation of America, a corporation of Delaware Application January 18, 1950, Serial No. 139,180

5 Claims. (Cl. 271—2.3)

This invention relates to motion picture equipment, and particularly to an automatic clutch starting unit or adjunct for the film driving system of a recorder or reproducer.

In motion picture recorders and reproducers, and particularly recorders, it is desirable that the film be accelerated up to its uniform speed in the shortest possible time, since the film being advanced during acceleration is not useable for recording sound, and usually more than one recorder and one or more cameras are operating simultaneously. In such film sound systems, a very uniform film speed is desired, and one of the means for obtaining the required uniform speed is a heavy inertia element such as a flywheel driven by the pull of the film passing over a roller or drum. The motor can bring the geared, toothed sprockets driving the film up to speed quite rapidly, but considerable time is required to bring the heavy flywheel mass up to uniform rotation solely by the pull of the film.

Several devices in the form of clutches have been used to positively drive the flywheel during the acceleration period and then automatically release it, so that it can be film driven thereafter and serve its purpose as a film speed stabilizer. One such automatic mechanism is disclosed and claimed in Black U. S. Patent No. 2,106,338 of January 25, 1938, this system utilizing centrifugal force to actuate the clutch elements. The present type of clutch is of simplified form, and one which may be an adjunct attachable to most of the standard types of commercial film sound recorders. It utilizes a spring pressed clutch plate which may be moved into contact with the flywheel, the clutch plate being positively driven from the motor drive. The clutch is actuated electrically, and, after its uniform speed has been reached, it is de-energized and allowed to separate from and free the flywheel.

The principal object of the invention, therefore, is to facilitate the acceleration of all the rotating elements of a film drive to a uniform speed in a short time period.

Another object of the invention is to provide an improved film pulled flywheel drive for a film advancing mechanism which is disconnected after a predetermined time period.

A further object of the invention is to provide an improved clutch adjunct which may be attached to a film driving apparatus for accelerating the flywheel at the same rate as the other rotating elements of the system.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
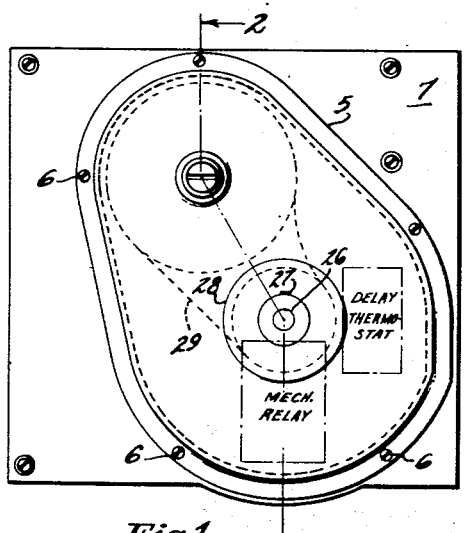
Fig. 1 is an end view of the invention shown attached to a recorder.

Referring now to the drawings, in which the same numerals identify like elements, a casing or housing 5 is attached by screws 6 to the casing or housing 7 of a sound recorder or reproducer. The recorder or reproducer elements shown are a worm gear 9 driven by a motor 44, the gear 9 being in mesh with a pinion 10 on a shaft 11, and on which is a toothed film sprocket 12. As is well-known, the film is threaded over the sprocket 12 and around a film-pulled drum 14 on a shaft 15, and on which is attached a flywheel 16. Upon acceleration of the sprocket 12, the film normally slips for a period over the drum 14 before the flywheel 16 is up to speed, which is some time after the sprocket 12 is at uniform speed. The unit shown in the casing 5 is adapted to bring the flywheel up to speed in the same short period of time as the sprocket 12.

Mounted in an internal boss 20 of the casing 5, are bearing sleeves 21, in which is a rotatable shaft 22, to which is attached a sprocket wheel 23. The portion of shaft 22 to the right of the sprocket 23 is splined to portion 24 of shaft 11, so that rotation of the shaft 11 positively rotates the sprocket wheel 23. In the lower part of the housing 5, a fixed shaft 26 is held in position by set screw 27 in an external boss 28. Mounted on the shaft 26, is a rotatable sprocket wheel 30 with its hub 36 mounted on a bearing sleeve 31. A ladder chain 29 connects sprocket wheels 23 and 30. One end of the bearing sleeve abuts a roller bearing 32, and its other end abuts one end of a coiled spring 33, the other end of spring 33 being positioned against a head 34 of the shaft 26. Since the shaft 26 is fixed, the spring 33 urges the sprocket 30 to the left. Mounted on the sprocket wheel hub 36, is a disc 37, to which is attached a friction ring 38 which is normally maintained away or separated from the left-hand surface of flywheel 16 by the spring 33.

To bring the friction disc 38 into contact with the flywheel 16, a solenoid relay 40 is energized, this relay drawing the end 41 of its armature downwardly, which moves the end 42 to the right. The relay coil and armature are mounted in a bracket 43, and the end 42 contacts a slidable collar 39. As the compression of the spring 33 is overcome, the ring 38 contacts the flywheel 16, and the flywheel is then directly connected to the shaft 11 over sprocket wheels 23 and 30 and chain 29. The flywheel will be brought up to speed simultaneously with film sprocket 12.

Figure 3:
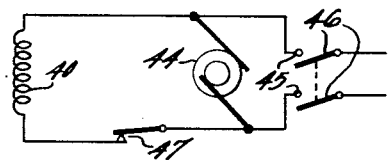
Fig. 3 is a schematic view of the electrical portion of the invention.

Referring now to Fig. 3, the motor 44 is shown diagrammatically connected across terminals 45, which are connected to an electrical power source when a starting switch 46 is closed. Simultaneously, with the energizing of the motor 44, the solenoid coil 40 will be energized over a thermostatic switch 47, which is adjusted to open its contacts at the end of the same time period required for the drive mechanism and film sprocket 12 to come up to speed. At this instant, the spring 33 will release the friction ring 38 from the flywheel and it will be driven thereafter solely by the film pull.

Figure 4:
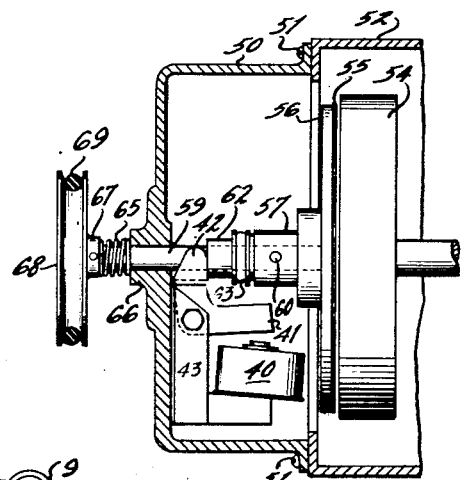
Fig. 4 is a cross-sectional view of a modification of the invention.
Figure 2:
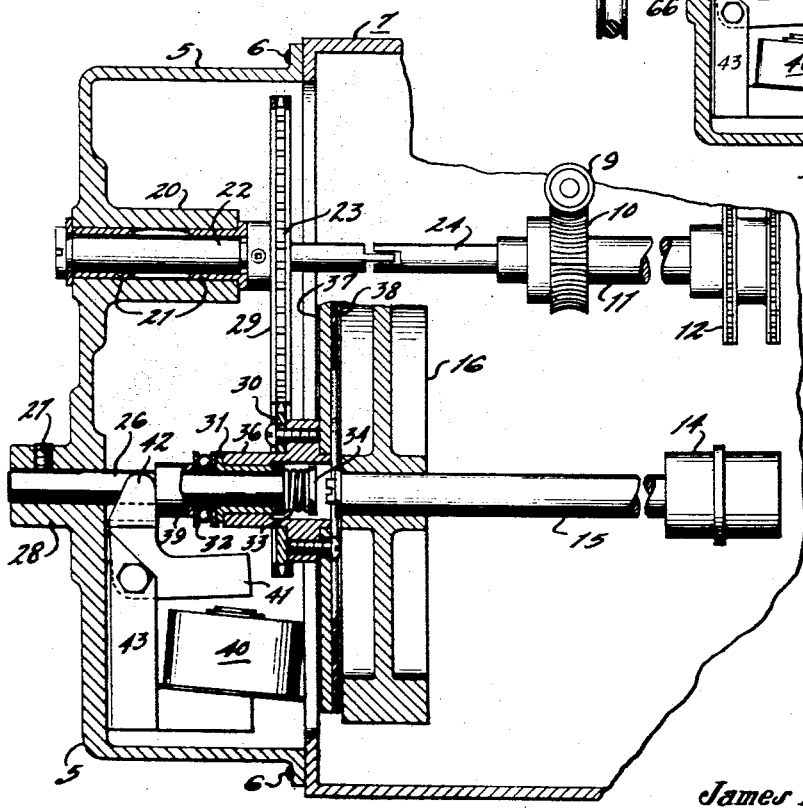
Fig. 2 is a cross-sectional view taken along the line 2—2 of Fig. 1.

The modification shown in Figs. 1 and 2 is one wherein the power is obtained internally of the recorder drive mechanism. In Fig. 4, a modification is shown wherein the sprocket and chain drive is eliminated, and the clutch plate is driven externally by a belt connected to another portion of the recorder or to an auxiliary motor. Referring now to Fig. 4, a casing 50 is attached by screws 51 to a recorder housing 52. The flywheel 54 is driven when the friction plate 55 is pressed against its face by a disc 56 mounted on a hub 57 pinned to a shaft 59 by a pin 60. The same relay 40 and armature 41—42 are illustrated, which, upon energization, will move the disc 56 and friction ring 55 into contact with the flywheel 54. Pressure is applied to the hub 57 through collar 62 and a bearing ring 63, and, against the tension of a coiled spring 65 positioned between the face of a boss 66 and a hub 67 of a drive pulley 68, which is driven by a belt 69. The same energization circuit shown in Fig. 3 is used for the modification shown in Fig. 4, so that the clutch ring 55 will be in contact with the flywheel only during the period of acceleration, the thermostatic switch 47 de-energizing the relay when the film driving mechanism has reached uniform speed.

The above units may, therefore, be constructed as a part of an original recorder or reproducer, or be attached to existing recorders and reproducers as described above. The reduction in the time of acceleation not only saves film by bringing it up to recording speed in a shorter time period, but also prevents damage to the film when it is forced to slip too rapidly over the recording or reproducing drum.

I claim:
1. A mechanism for attachment to the housing of a film advancing mechanism provided with a film driven flywheel, comprising a casing; a shaft extending across said casing in position to be aligned with the axis of rotation of said flywheel, a shiftable clutch driving element rotatably mounted on said shaft and adapted to engage said flywheel to drive the same; means interposed between said clutch element and flywheel for normally maintaining the same in disengaged position; a solenoid relay connected to said clutch element for causing said element to engage said flywheel simultaneous with the commencement of the advancement of the film in the mechanism; and means for declutching the said driving clutch element from said flywheel, the said means comprising an electric circuit connecting a motor and the said solenoid relay through a thermostatic switch adjusted to open its contacts at the end of the same time period required for the film drive member to come up to speed whereby said clutch engages said flywheel only during the period of acceleration of said mechanism.

2. A detachable film drive starting device for attachment to the housing of a film advancing mechanism provided with a rotatable film driven inertia element, the said drive starting device comprising a casing adapted to be secured to said housing opposite the said inertia element; a shaft extending across said casing in position to be aligned with the axis of rotation of said inertia element when the said device is mounted in position of use; a driving friction disc carried on one end of said shaft; means whereby said disc may be shifted into engagement with the outer face of said inertia element, the said means including instrumentalities comprising an electrical circuit including a thermostatic switch for shifting the said disc into engagement with the inertia element at the start of said film drive and shifting said disc and inertia element out of engagement after said film drive has stopped accelerating.

3. The device as claimed in claim 2 wherein the means for shifting the said disc into engagement with the said inertia element comprises a pivoted bell-crank lever one end of which is adapted to exert pressure on the said disc to shift the same into coupling engagement with said inertia element and the other end of said lever consists of an armature; and a solenoid juxtaposed to said armature for actuating the same.

4. The combination with a motion picture recorder and reproducer comprising a housing in which are mounted a motor driven film drive shaft and a film driven shaft extending parallel to said drive shaft and having a flywheel mounted on the end thereof, of a clutch starting unit for quickly bringing the said flywheel up to the speed required for the normal operation of the film drive, the said unit comprising a casing detachably secured to said housing and across which extends a first shaft detachably secured to an end of the said film drive shaft; a gearing carried by the said first shaft; a second shaft extending across said casing; a clutch element in the form of a friction plate including a gearing slidably mounted on said second shaft, the said element being spring biased out of operative position and juxtaposed to said flywheel to engage a side face of the same; means connecting the gearing aforesaid; a solenoid relay positioned to shift the said clutch element into clutching engagement with said flywheel at the start of said film drive; and an electric circuit connecting the said relay through a thermostatic switch adjusted to open its contacts at the end of the same time period required for the film drive member to come up to speed, whereby the slidable clutch member will automatically be restored to nonoperative position when the operating speed has been reached.

5. A detachable film drive starting device for attachment to housing of a film advancing mechanism provided with a film advancing element driven by an electric motor and a film pulled element having a flywheel thereon, the said drive comprising a casing adapted to be secured to said housing opposite the said flywheel; a shaft journaled in said casing and adapted to be connected to a driven shaft of said mechanism; a sprocket on said shaft; a second shaft journaled in said casing, the said shaft carrying on one end thereof a combined sprocket and driving clutch element and being adapted to be aligned with the shaft carrying said flywheel; a spring interposed between said flywheel shaft and said combined sprocket and driving clutch element for maintaining the latter out of clutching engagement with said flywheel; a sprocket chain trained over said sprockets; and means to shift said combined sprocket and driving clutch element into engagement with said flywheel, the said means comprising a pivoted bell-crank lever one end of which is adapted to exert pressure on said combined sprocket and driving clutch element to shift the same into engagement with said flywheel and the other end of which consists of an armature; a solenoid juxtaposed to said armature for actuating the same; a thermostatic switch; the said solenoid, and switch being electrically connected with said electric motor so that said motor, switch and clutch are actuated simultaneously; and the said switch being adjusted to close its contacts at the start and to open its contacts at the end of the same time period required for the film drive sprocket to come up to speed, whereby the driving clutch element will automatically be restored to nonoperative position.

References Cited in the file of this patent

UNITED STATES PATENTS

| | | |
|---|---|---|
| 1,908,786 | Pioch | May 16, 1933 |
| 2,098,215 | Black | Nov. 9, 1937 |
| 2,106,338 | Black | Jan. 25, 1938 |
| 2,233,284 | Collins | Feb. 25, 1941 |